United States Patent [19]

Herter

[11] 4,015,360
[45] Apr. 5, 1977

[54] FIBERGLASS FISHING ROD WITH CARBON FILAMENT INSERT

[75] Inventor: George L. Herter, Waseca, Minn.

[73] Assignee: Herter's, Inc., Waseca, Minn.

[22] Filed: Sept. 11, 1975

[21] Appl. No.: 612,536

[52] U.S. Cl. .............................................. 43/18 GF
[51] Int. Cl.² ....................................... A01K 87/00
[58] Field of Search ........................... 43/18, 18 GF

[56] References Cited

UNITED STATES PATENTS 3,461,593  8/1969  Martuch et al. .................. 43/18 GF

FOREIGN PATENTS OR APPLICATIONS 1,349,906  4/1974  United Kingdom ............. 43/18 GF
1,351,732  5/1974  United Kingdom ............. 43/18 GF Primary Examiner—Warner H. Camp
Attorney, Agent, or Firm—Williamson, Bains, Moore & Hansen

[57] ABSTRACT

An elongate hollow tapered rod formed of fiberglass reinforced plastic includes an elongate handle, an elongate intermediate section and an end section detachably connected together. An elongate flex-resistant element formed of graphite threads is positioned interiorly of and secured to the end portion of the fishing rod. The graphite flex-resistant element is more rigid but of substantially lighter weight than the fiberglass reinforced plastic to thereby impart stiffness to the end section without noticeably increasing the weight thereof.

2 Claims, 6 Drawing Figures

U.S. Patent   April 5, 1977   4,015,360
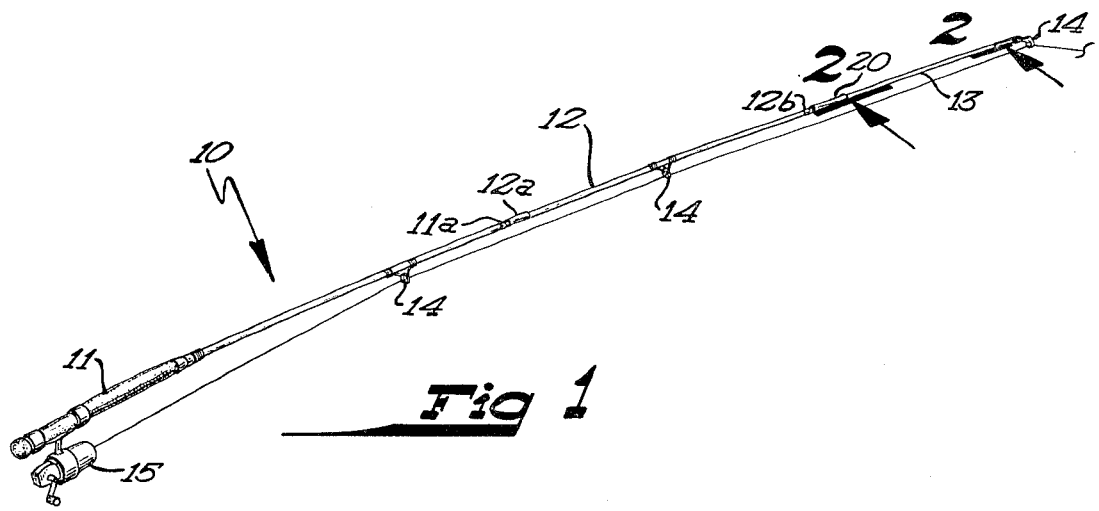
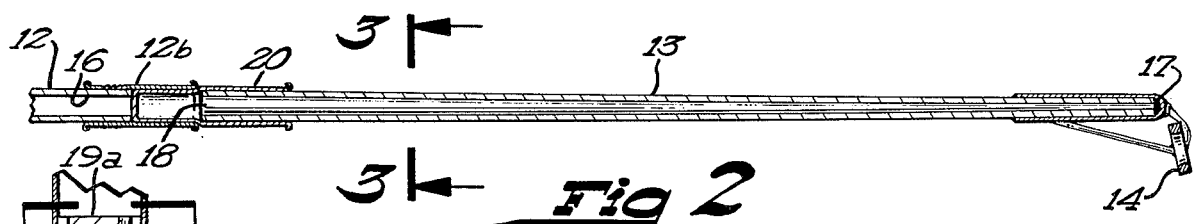
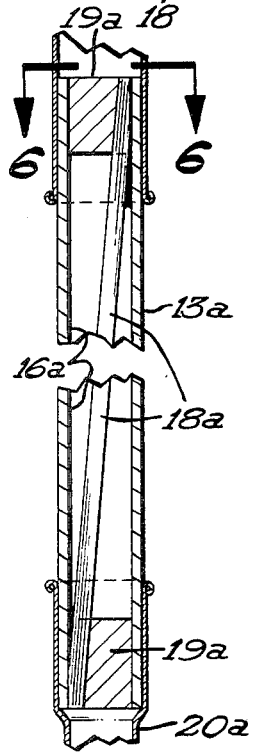
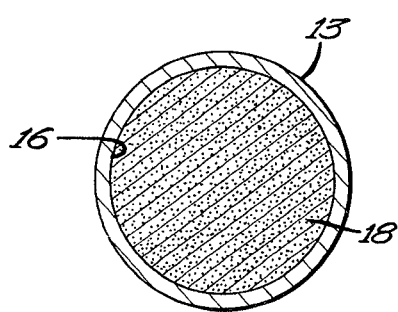
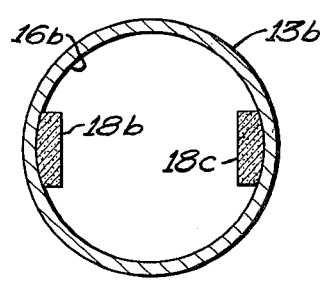
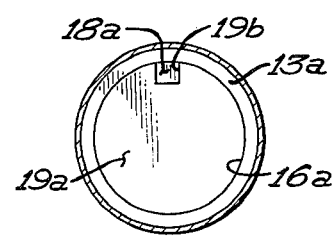

FIBERGLASS FISHING ROD WITH CARBON FILAMENT INSERT

SUMMARY OF THE INVENTION

This invention relates to fishing rods and more particularly to means for imparting stiffness to a fishing rod without noticeably increasing the weight thereof.

Many fishing rods are formed of a fiberglass reinforced resin system and while such fishing rods are of light-weight construction, sometimes these fiberglass rods are more flexible than is desired. Expensive materials are usually required in order to construct a more rigid but more light-weight fishing rod. Fishing rods formed of graphite are presently available, but such fishing rods are quite expensive because of the expense of such graphite material.

It is therefore a general object of this invention to provide an elongate tapered fiberglass reinforced fishing rod with a flex-resistant element which imparts stiffness to the fishing rod without noticeably increasing the weight thereof and without substantially increasing the cost thereof.

In carrying out this object, the flex-resistant element, which is preferably formed of graphite threads, is inserted into and extends throughout at least the end section of the fishing rod. In one embodiment of the invention, the flex-resistant insert fills the interior of that portion of the rod in which it is inserted. In another embodiment, the flex-resistant element insert is a much smaller cross-sectional size than the cross-sectional size of the opening of the hollow fishing rod.

It will therefore be seen that by using small elongate flex-resistant elements of threaded graphite, fiberglass fishing rods may be inexpensively provided with a desired stiffness without noticeably increasing the weight thereof.

These and other objects and advantages of this invention will more fully appear from the following description made in connection with the accompanying drawings whereinlike referenced characters refer to the same or similar parts throughout the several views.

FIGURES OF THE DRAWINGS

FIG. 1 is a perspective view of a fishing rod embodying the present invention.

FIG. 2 is a cross-sectional view taken approximately along line 22 of FIG. 1 and looking in the direction of the arrows.

FIG. 3 is a cross-sectional view taken approximately along line 33 of FIG. 2 and looking in the direction of the arrows.

FIG. 4 is a fragmentary longitudinal sectional view of a portion of the fishing rod similar to FIG. 2 and illustrating a modified form of the invention, and FIG. 5 is a cross-sectional view similar to FIG. 3 and illustrating a further embodiment of the invention.

FIG. 6 is a cross-sectional view taken approximately along 6—6 of FIG. 4 and looking in the direction of the arrows.

DESCRIPTION OF THE PREFERRED EMBODIMENT OF THE INVENTION

Referring now to the drawings and more specifically to FIG. 1, it will be seen that one embodiment of the novel fishing rod, designated generally by the referenced numeral 10 is there shown. The fishing rod 10 is preferably a hollow glass rod formed of a fiberglass reinforced resin system and includes a handle 11, an intermediate section 12, and an end section 13. These sections are detachably connected together by telescoping metallic coupling elements in a well-known manner. In this respect, the handle section 11 has a coupling element 11a on the outer end thereof which telescopically receives a coupling element 12a of the intermediate section 12. Similarly, the intermediate section 12 also has a metallic sleeve 12b on its outer end which telescopically receives a coupling element 13a of the outer section. The handle section is provided with a conventional reel 15 and each of the sections are provided with guides 14 for guiding the fishing line.

It is pointed out above, the fishing rod 10 is formed of fiberglass and is of hollow construction. In some instances, it is desirable to use a rod wherein the action is stiff since soft rods absorb the force of the cast too much and the distance is shortened. In order to impart stiffness to the rod, without substantially increasing the weight thereof, a flex-resistant element is provided for at least the end section 13 of the fishing rod. In the embodiment shown in FIGS. 1, 2 and 3, the outer end of the end section 13 is closed with a plug 17 in a well-known manner. A flex-resistant element 18 is inserted into the hollow interior 16 of the end section 13 throughout the length of the latter. The flex-resistant element 18 is of elongate tapered construction and is formed of graphite fibers so that it snugly fits into the end section 13.

This flex-resistant element 18 is wedged in place in the end section 13 and imparts a stiff action to the end section of the rod without noticeably increasing the weight thereof. It is also pointed out that in some instances, a flex-resistant element 18 may be provided for the intermediate section or sections as desired. It is further pointed out that in rods constructed of one piece, a flex-resistant element may be inserted in and secured to a portion of the fishing rod. It is preferred that such a flex-resistant element extend throughout the entire length or some predetermined length of a single-piece rod.

Referring now to FIG. 4, it will be seen that a slightly modified form of the flex-resistant element is there shown and is designated generally by the referenced numeral 18a. The flex-resistant element 18a is also formed of graphite thread but it will be noted that the cross-sectional size of the element is substantially smaller than the cross-sectional size 16a of the end section 13a with which it is associated. The flex-resistant element is arranged to extend diagonally from one end portion of the end section 13a to a point adjacent the other end thereof. In the embodiment shown, the end portions of the flex-resistant element 18a are inserted into plugs 18b formed of cork, plastic or the like, which are wedged in the ends of the end section 13a. These plugs firmly anchor the flex-resistant element 18a in place in the end section. Again it is pointed out that a flex-resistant element may also be provided in the intermediate section as well as the handle section of a fishing rod or substantially the entire length of a one-piece fiberglass rod. It is further pointed out that the end portions of the flex-resistant graphite element may be secured in place by a suitable glue resin, plastic or cement.

Referring now to FIG. 5, it will be seen that a further embodiment of the flex-resistant means is there shown. In this embodiment, a pair of flex-resistant elements 18b and 18c are provided each corresponding to the length of the end section or 13*b* with which it is associated. Again it will be noted that the cross-sectional size of the flex-resistant elements 18*b* and 18*c* are substantially smaller than the cross-sectional size 16*b* of the end section 13*b*. These flex-resistant elements are formed of graphite threads and may be secured to the inner surfaces of the end section of the rod by an anchoring plug or by suitable cement of the like. Although the length of the flex-resistant elements 18*b* and 18*c* are not shown, it is again pointed out these elements would have a length dimension corresponding to the section with which they are associated. When used with a single rod, such elements could extend throughout the length of the rod.

Although the embodiment of FIGS. 1-3 disclose the use of a graphite element 18 which substantially fills the interior of the rod section, the graphite element 18 could be of lesser cross-sectional size such as the embodiments of FIGS. 4-6. It is also pointed out that the insert could be continually located with respect to the interior of the rod section rather than positioned adjacent one side of the interior of the rod section as shown in FIGS. 5 and 6.

By using a flex-resistant insert formed of graphite threads, not only can stiffness be imparted to the rod without noticeably increasing the weight thereof, but this may be done inexpensively with respect to fiberglass rods. It will be appreciated that the use of an flex-resistant insert of the type described is much less expensive than forming a fishing rod of graphite threads.

Thus it will be seen that I have provided a fiberglass fishing rod with a flex-resistant graphite element which not only imparts stiffness to the fishing rod without noticeably increasing the weight thereof but permits this improved function to be accomplished in a simple and inexpensive way.

What is claimed is:

1. An elongate tapered fishing rod formed of fiberglass reinforced plastic comprising:
   an elongate handle;
   an elongate end portion connected to said handle and projecting longitudinally therefrom, said end portion including an elongate intermediate section and an elongate end section detachably connected together, said intermediate section being detachably connected with said handle;
   an elongate flex-resistant element secured to said end portion and extending throughout the length of said end section;
   said flex-resistant element being formed of graphite threaded material and being of a lighter weight and greater stiffness than the fiberglass reinforced plastic to thereby impart substantial stiffness to that part of the end portion of the fishing rod with which it is associated without noticeably increasing the weight thereof, said flex-resistant element comprising an elongate flat strip having a cross-sectional size substantially less than the cross-sectional size of the hollow interior of said end section and being positioned interiorly thereof, said flex-resistant element extending diagonally of said end section from adjacent one end thereof to substantially the other end thereof.

2. An elongate tapered fishing rod formed of fiberglass reinforced plastic comprising:
   an elongate handle;
   an elongate end portion connected to said handle and projecting longitudinally therefrom, said end portion including an elongate intermediate section and an elongate end section detachably connected together, said intermediate section being detachably connected with said handle,
   an elongate flex-resistant element secured to said end portion and extending throughout a substantial part of the length of said end portion; said flex-resistant element being formed of graphite threads and having a length dimension corresponding to and extending throughout one of said sections;
   said flex-resistant element being of a lighter weight and greater stiffness than the fiberglass reinforced plastic to thereby impart substantial stiffness to that part of the end portion of the fishing rod with which it is associated without noticeably increasing the weight thereof, said flex-resistant element comprising an elongate flat strip having a cross-sectional size substantially less than the cross-sectional size of the hollow interior of said end section and being positioned interiorly thereof, and a second flex-resistant element being of substantially identical construction to said first mentioned flex-resistant element, said elements being secured to the inner surface of said end section and being disposed in opposed relation with respect to each other.

* * * * *